US012024928B2

(12) United States Patent
Van Klompenburg et al.

(10) Patent No.: US 12,024,928 B2
(45) Date of Patent: Jul. 2, 2024

(54) MULTI-POINT LOCKING SYSTEM

(71) Applicant: Pella Corporation, Pella, IA (US)

(72) Inventors: Marlo Van Klompenburg, Pella, IA (US); Ted L Hansen, Pella, IA (US); Evan R. Vande Haar, Pella, IA (US); Todd M. Leathers, Pella, IA (US)

(73) Assignee: Pella Corporation, Pella, IA (US)

( * ) Notice: Subject to any disclaimer, the term of this patent is extended or adjusted under 35 U.S.C. 154(b) by 313 days.

(21) Appl. No.: 17/220,484

(22) Filed: Apr. 1, 2021

(65) Prior Publication Data

US 2021/0222467 A1 Jul. 22, 2021

Related U.S. Application Data

(63) Continuation of application No. 15/689,678, filed on Aug. 29, 2017, now Pat. No. 10,968,663.

(60) Provisional application No. 62/381,429, filed on Aug. 30, 2016.

(51) Int. Cl.

| | |
|---|---|
| ***E05B 65/08*** | (2006.01) |
| ***E05B 63/18*** | (2006.01) |
| ***E05C 9/04*** | (2006.01) |
| *E05B 17/00* | (2006.01) |

(52) U.S. Cl.

CPC ........ *E05B 65/0817* (2013.01); *E05B 63/185* (2013.01); *E05C 9/047* (2013.01); *E05B 17/005* (2013.01); *E05C 9/046* (2013.01)

(58) Field of Classification Search

CPC .. E05B 63/185; E05B 17/005; E05B 65/0817; E05C 9/047

See application file for complete search history.

(56) References Cited

U.S. PATENT DOCUMENTS

| | | | | |
|---|---|---|---|---|
| 1,131,752 | A | 3/1915 | Voigt | |
| 1,144,537 | A | 6/1915 | Gabriel | |
| 1,370,928 | A | 3/1921 | Swanson | |
| 1,934,105 | A | 11/1933 | Totty | |
| 2,223,765 | A | 12/1940 | Komenak | |
| 2,225,663 | A | 12/1940 | Segal | |
| 2,238,066 | A | 4/1941 | Mantz | |
| 2,326,069 | A | 8/1943 | Samzelius | |
| 2,387,187 | A | 10/1945 | Smith | |
| 2,498,508 | A | 2/1950 | Rudolph | |
| 3,019,043 | A * | 1/1962 | Woodworth ........ | E05B 65/0817 292/113 |
| 3,342,516 | A * | 9/1967 | Morand .............. | E05B 65/0057 292/6 |
| 4,511,166 | A | 4/1985 | Weinerman | |
| 6,327,879 | B1 | 12/2001 | Malsom | |
| 6,672,632 | B1 * | 1/2004 | Speed ................. | E05B 65/0858 292/DIG. 60 |
| 7,604,265 | B2 * | 10/2009 | Tsai .................... | E05B 65/0858 292/28 |
| 8,827,324 | B2 * | 9/2014 | Furgiuele .............. | E05B 65/087 292/137 |
| 10,378,243 | B2 | 8/2019 | Ke et al. | |

(Continued)

*Primary Examiner* — Mark A Williams

(74) *Attorney, Agent, or Firm* — FAEGRE DRINKER BIDDLE & REATH LLP

(57) ABSTRACT

Fenestration systems and associated methods include use of a lock assembly having a housing, a cam gear, a reversal gear, and one or more catches. Various aspects relate to enhanced locking/security, including repeatability and overall efficacy.

20 Claims, 14 Drawing Sheets

(56) References Cited

U.S. PATENT DOCUMENTS

| | | | | |
|---|---|---|---|---|
| 2004/0145189 | A1 | 7/2004 | Liu | |
| 2004/0195841 | A1* | 10/2004 | Liu | E05B 63/0013 292/24 |
| 2004/0227349 | A1 | 11/2004 | Denys | |
| 2004/0256860 | A1* | 12/2004 | Tsai | E05C 3/041 292/51 |
| 2006/0091679 | A1 | 5/2006 | Tsai | |
| 2006/0130543 | A1* | 6/2006 | Alchin | E05C 9/047 70/100 |
| 2007/0259551 | A1* | 11/2007 | Rebel | E05B 63/0056 439/260 |
| 2007/0290511 | A1* | 12/2007 | Liang | E05B 65/0858 292/24 |
| 2008/0258475 | A1* | 10/2008 | Chung | E05C 9/1875 292/25 |
| 2009/0134634 | A1* | 5/2009 | Atkinson | E05B 63/06 292/26 |
| 2010/0037525 | A1* | 2/2010 | Sato | E05B 17/0025 74/89.17 |
| 2018/0058105 | A1 | 3/2018 | Van et al. | |

* cited by examiner

MULTI-POINT LOCKING SYSTEM

CROSS REFERENCE TO RELATED APPLICATION

The present application is a continuation of U.S. application Ser. No. 15/689,678, filed Aug. 29, 2017, issuing as U.S. Pat. No. 10,968,663 on Apr. 6, 2021, and titled MULTI-POINT LOCKING SYSTEM which claims benefit to Provisional Patent Application Ser. No. 62/381,429, filed on Aug. 30, 2016 and titled MULTI-POINT LOCKING SYSTEM, the entire disclosures of which are hereby incorporated by reference herein.

TECHNICAL FIELD

Various aspects of the instant disclosure relate to hardware for fenestration products, such as sliding glass patio doors. In some specific examples, the disclosure concerns a multi-point lock mechanism for a fenestration assembly.

BACKGROUND

In many instances, unlawful intrusion into a home or building is gained through a standard fenestration product, such as a sliding door. Accordingly, it is very important that the door include a lock mechanism for securely locking the product in a closed position. It is also important that the lock mechanism provides security without sacrificing durability, practicality, simplicity and economic feasibility. Examples of prior art lock mechanisms are described in U.S. Pat. No. 6,327,879 issued to Malsom et al. on Dec. 11, 2001.

SUMMARY

Various aspects of the disclosure relate to two-point lock assembly, also described as a multi-point lock assembly, for engaging with multiple latch assemblies in a reliable manner. Some examples also include features for providing such multi-point lock assemblies with integrated sensor functionality (e.g., lock/unlock, open/close, secure/unsecure, or others). Some examples of the multi-point lock assemblies facilitate alignment with the latch assemblies by facilitating locating a pair of catches of a strike assembly in relatively close proximity to one another in comparison to other designs (e.g., such as those described in U.S. Pat. No. 6,327,879 issued to Malsom et al. on Dec. 11, 2001). Still further examples help avoid automatic/inadvertent lock actuation.

While multiple, inventive examples are specifically disclosed, various modifications and combinations of features from those examples will become apparent to those skilled in the art from the following detailed description. Accordingly, the disclosed examples are meant to be regarded as illustrative in nature and not restrictive.

DETAILED DESCRIPTION

Locking systems according to the inventive examples can be employed in a variety of fenestration units, including sliding patio doors, for example. The locking systems provide a variety of features, including improved door/frame catch alignment, encouraging closing forces that are centered in between door/frame catches for more reliable operation, prevention of lock actuation when door catches are in an open position, compatibility with sensing and automation systems, as well as others.

Figure 1:
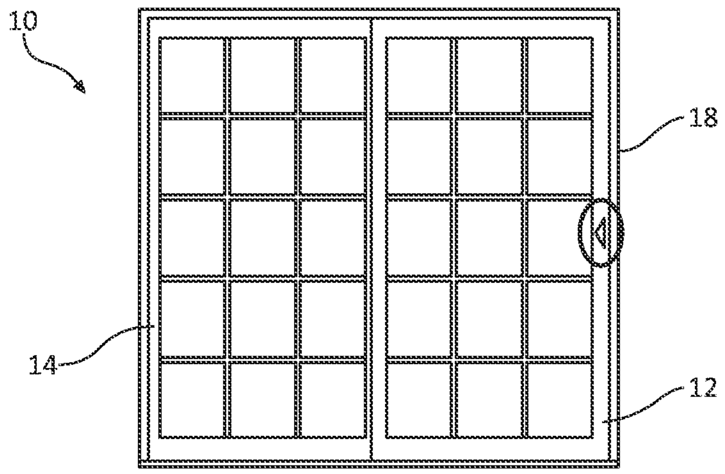
FIG. 1 is a schematic view of a fenestration assembly, according to some examples.

FIG. 1 is a schematic view of a fenestration assembly 10 including a first panel 12, a second panel 14, and a frame 18, according to some examples. The first panel 12 is optionally a panel that opens by sliding, often termed a "vent" panel and the second panel 14 is optionally a stationary panel, often termed a "fixed" panel. Panels of fenestration units (e.g., door panels) are often described in terms of vertical stiles and horizontal rails. Frames of fenestration units are often described in terms of vertical side jambs, a horizontal head, and a horizontal sill. Some examples of suitable fenestration units usable with locking systems according to the instant disclosure include those sold under the trade name "PROLINE 450 SERIES," "ARCHITECT SERIES," and "DESIGNER SERIES" by Pella Corporation of Pella, Iowa. In the usual manner, the first panel 12 is slidably mounted within a roller track, for example, horizontal movement between the jambs. Although the examples below are provide with reference to a sliding door, it should be understood that these features are equally applicable to a sliding window. As such, each example below should also be considered applicable to other types of fenestration units, such as sliding windows.

Figure 2:
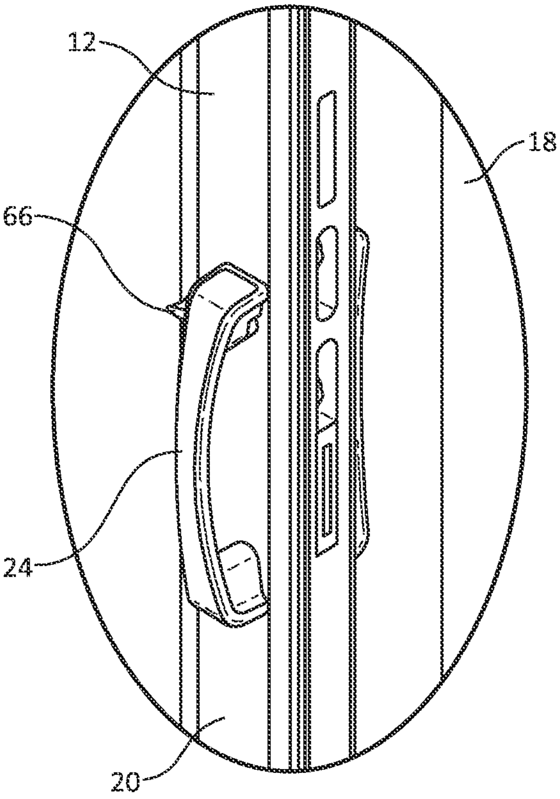
FIG. 2 is a perspective view of a portion of the fenestration assembly indicated in FIG. 1 with a first panel partially opened or ajar, according to some examples.

FIG. 2 is a perspective view of a portion of the fenestration assembly indicated in FIG. 1 with the first panel 12 partially opened or ajar, according to some examples. As indicated on FIGS. 1 and 2, the first panel 12 includes a lock stile 20, also described as a panel edge, and the frame 18 includes a lock jamb 22, also described as a frame edge. The lock stile 20 defines a pocket 20*a* for receiving a portion of a locking system 30 (FIG. 3) and the lock jamb 22 includes a pocket 22*a* for receiving a complementary portion of the locking system 30 to that of the lock stile 20. As shown in FIG. 2, the lock stile 20 includes a handle 24 to assist with moving the first panel 12 and one or more operators for locking and unlocking the locking system 30.

Figure 3:
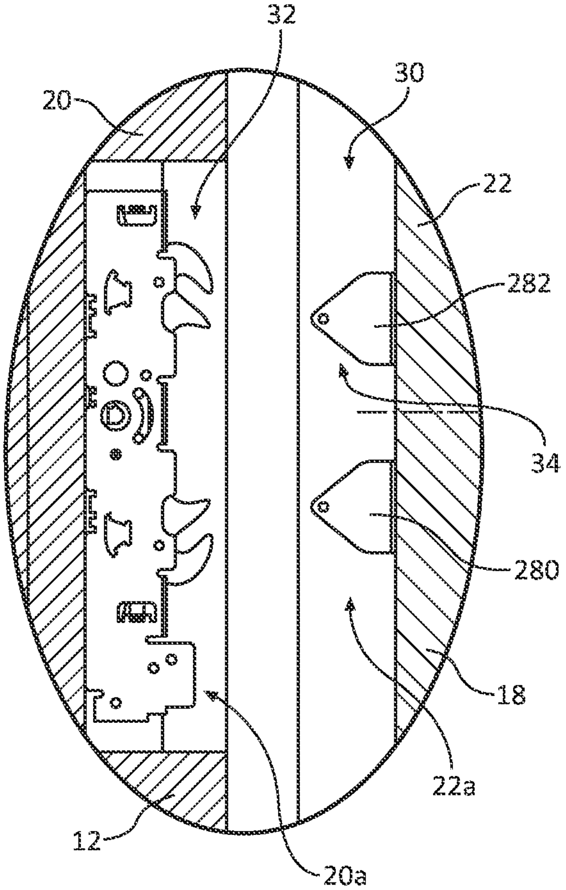
FIG. 3 shows the portion of the fenestration assembly indicated in FIG. 1 with portions removed for ease of visualization, according to some examples.

FIG. 3 shows the portion of the fenestration assembly 10 indicated in FIG. 1 with partial sections of the lock stile 20 and lock jamb 22 removed for ease of visualization, according to some examples. As shown, the locking system 30 of the fenestration assembly 10 includes a lock assembly 32, also described as a catch assembly, installed as part of the lock stile 20 and a strike assembly 34, also described as a catch receiver assembly, installed as part of the lock jamb 22. In different terms, the lock stile 20 can be said to include the lock assembly 32 and the lock jamb 22 can be said to include the strike assembly 34, although a reversal of positions of the lock assembly 32 and the strike assembly 34 is contemplated (e.g., where the lock assembly 32 is part of the lock jamb 22 and the strike assembly 34 is part of the lock stile 20). Various components of the lock assembly and strike assembly 34 are optionally formed of metal and/or plastic components using one or more punching, bending, casting, molding and/or other manufacturing methods as desired.

Figure 4:
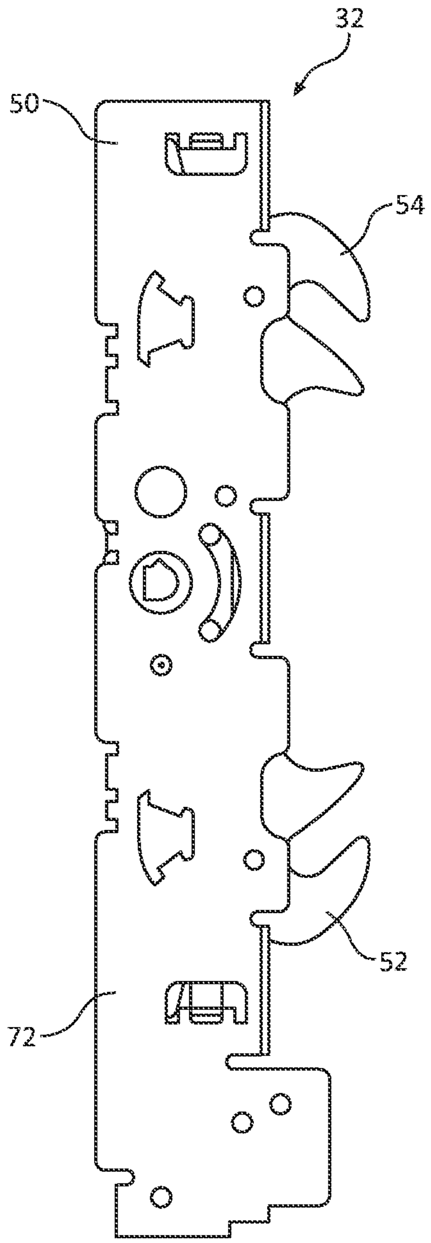
FIG. 4 is a side view of a lock assembly in an open state and FIG. 5 is a side view of the lock assembly in a closed state, according to some examples.
Figure 5:
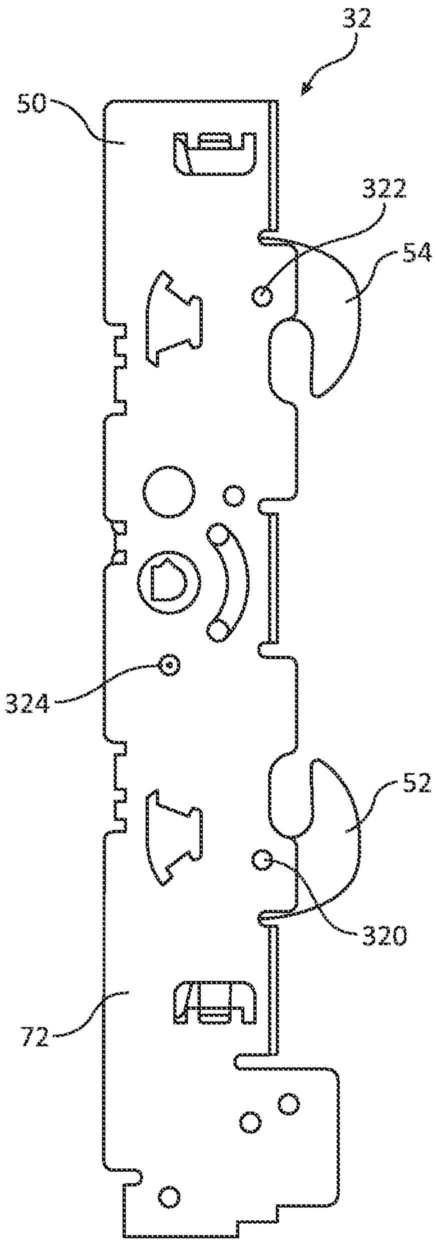
Figure 6:
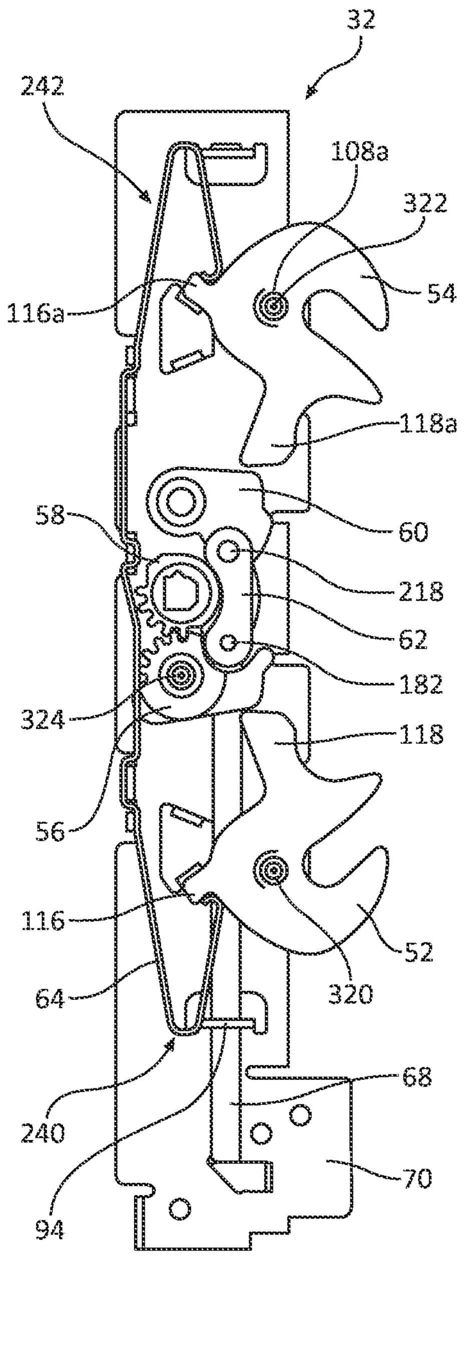
FIG. 6 is a side view of the lock assembly with a portion removed to show internal components of the lock assembly, according to some examples.
Figure 7:
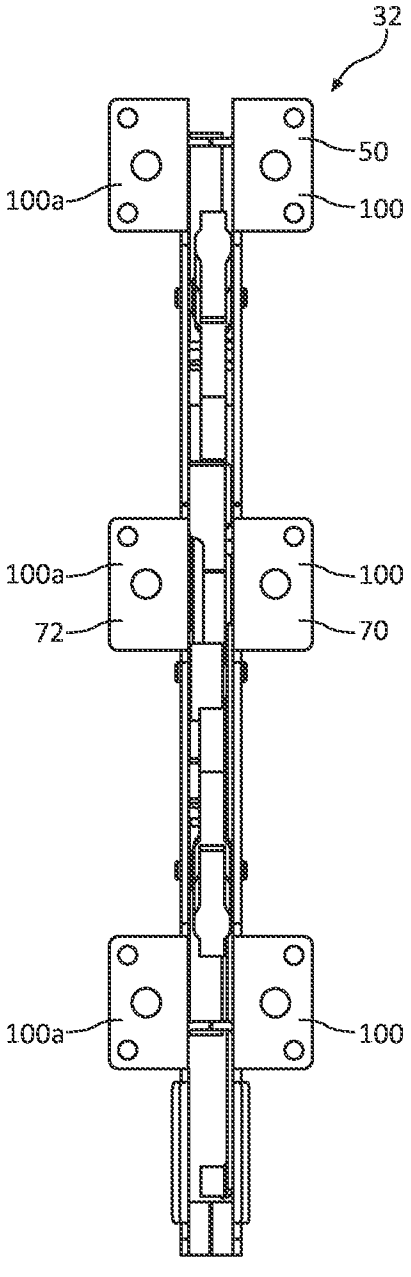
FIG. 7 is a front view of the lock assembly, according to some examples.
Figure 8:
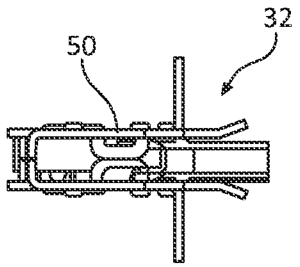
FIG. 8 is a bottom view of the lock assembly in an open state, according to some examples.

FIG. 4 is a side view of the lock assembly 32 in an open state and FIG. 5 is a side view of the lock assembly 32 in a closed state, according to some examples. FIG. 7 is a front view of the lock assembly 32 and FIG. 8 is a bottom view of the lock assembly 32, each of which shows the lock assembly 32 in an open state, according to some examples. As described in greater detail, the lock assembly 32 is configured to transition from the open state to the closed state during engagement with the strike assembly 34. FIG. 6 is a side view of the lock assembly 32 with a portion of a housing 50 of the lock assembly 32 removed to show internal components of the lock assembly 32. As shown, the lock assembly 32 includes a first catch 52 pivotally secured to the housing 50, a second catch 54 pivotally secured to the housing 50, a cam gear 56, a reversal gear 58, a lock cam 60, a link 62, and a spring 64. The lock assembly 32 also optionally includes an interior lock operator 66 (FIG. 25) and exterior lock operator (e.g., a key-operated lock cylinder, not shown) for manually operating the reversal gear 58 between its locked and unlocked positions. In some examples, the lock assembly 32 also includes an accessory bar 68, for interaction with a sensor (e.g., wireless sensor system) and/or actuator (e.g., electric motor system).

Figure 11:
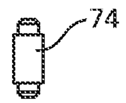
FIG. 11 shows a pin, or post, that is used in the examples of the Figures to help secure the first and second plates together and to facilitate pivotal attachment of various components of the lock assembly to the housing, according to some examples.
Figure 10:
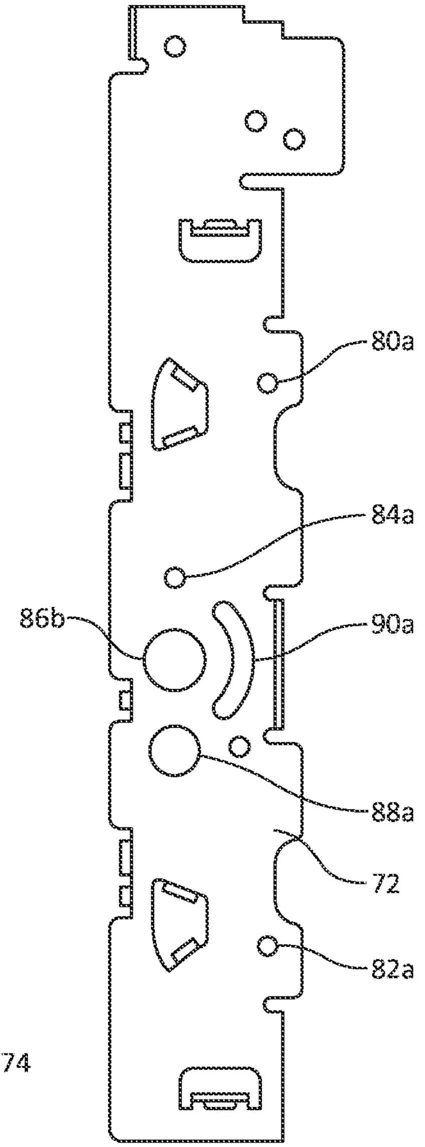
FIG. 10 is a side view of a second plate of the lock assembly, according to some examples.

The housing 50 of the lock assembly 32 is configured to maintain various components of the lock assembly 32 in an operational relationship with one another and to facilitate attachment of the lock assembly 32 to the panel 12. In some examples, the housing 50 includes a first plate 70 (also described as a first portion) and a second plate 72 (also described as a second portion). FIGS. 6 and 8 show the first plate 70 and FIG. 10 shows the second plate 72 from a side view, according to some examples. The first and second plates 70, 72 are held together via any of a variety of fastening means, including bolts, welds, posts, rivets and/or other features. FIG. 11 shows a pin 74, or post, that is used in the examples of the Figures to help secure the first and second plates 70, 72 together and to facilitate pivotal attachment of various components of the lock assembly 32 to the housing 50.

As shown, the first and second plates 70, 72 are optionally mirror images of one another. Therefore, in accordance with various examples, features of both the first and second plates 70, 72 are described collectively with respect to the features of the first plate 70.

Figure 9:
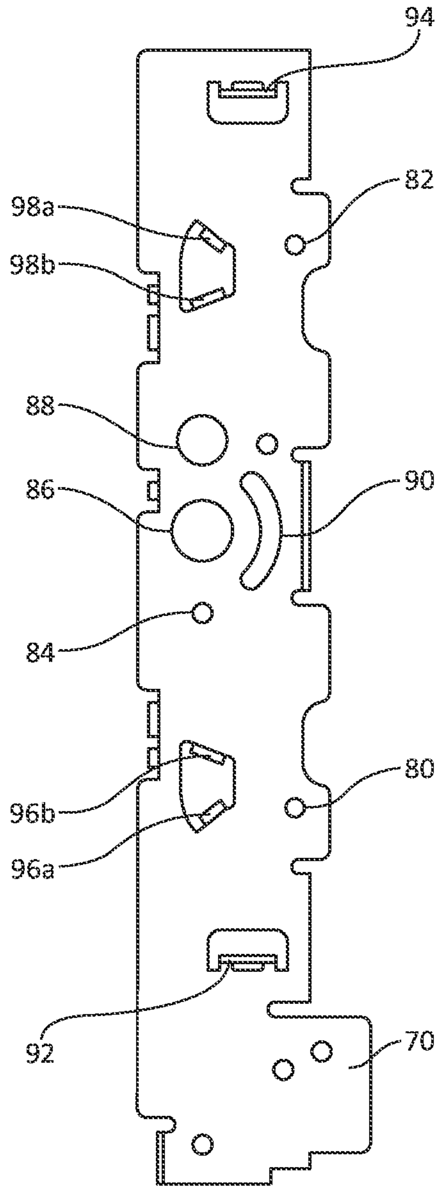
FIG. 9 is a side view of a first plate of the lock assembly, according to some examples.

FIG. 9 shows the first plate 70 from a side view, according to some examples. As shown in FIG. 9, the first plate 70 defines a first catch pivot aperture 80, a second catch pivot aperture 82, a cam gear aperture 84, a reversal gear aperture 86, and a lock cam aperture 88, a slot 90, a first arm guide 92, and a second arm guide 94. The arm guides are optionally formed as punched tabs with a central aperture sized for receiving the accessory bar 68 in a sliding relationship. The first plate 70 also includes a first pair of stops 96*a*, 96*b* for engaging the first catch 52 and a second pair of stops 98*a*, 98*b* for engaging second catch 54. The stops 96, 98 can be formed as tabs (e.g., punched/bent tabs) and help limit rotational travel of the first and second catches 52, 54, respectively. As better seen in FIG. 8, the first plate 70 includes one or more flanges 100 that are configured for attaching the first plate 70 to the first panel 12 (e.g., using screws, or other fasteners). The flanges 100 are optionally bent to a desired length (e.g., during a manufacturing punching/bending process) to accommodate different pocket depths in different panels.

As shown, the first and second catches 52, 54 are optionally substantially similar. Therefore, in accordance with various examples, features of both the first and second catches 52, 54 are described collectively with respect to the features of the first catch 52.

Figure 12:
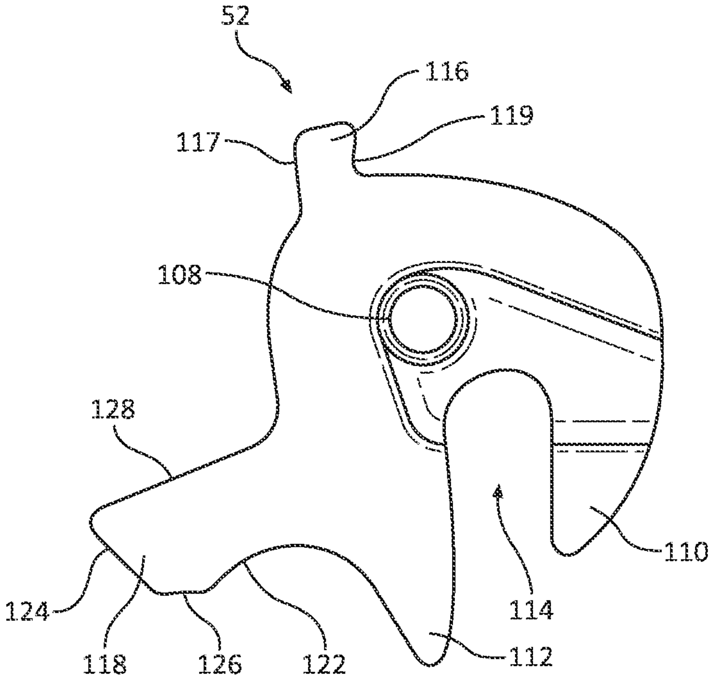
FIG. 12 is a view oriented from the side of a first catch of the lock assembly.
Figure 13:
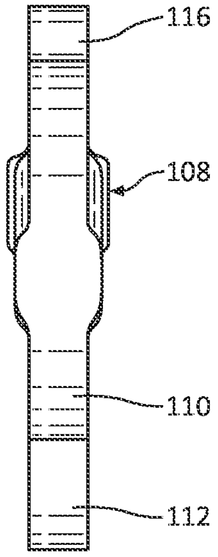
FIG. 13 is a view oriented generally from the back of the first catch.
Figure 14:
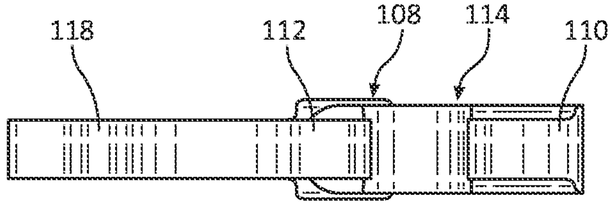
FIG. 14 is a view oriented generally from the front of the first catch, according to some examples.

FIG. 12 is a view oriented from the side of the first catch 52, FIG. 13 is a view oriented generally from the back of the first catch 52, and FIG. 14 is a view oriented generally from the front of the first catch 52, according to some examples. The first catch 52 has a pivot aperture 108 and includes a pair of spaced apart jaws 110, 112 cooperatively defining an open slot 114, a stop arm 116 extending in a direction generally opposite to the jaw 112, and a lock arm 118 projecting from the side of the first catch 52 on which the jaw 112 is located and at an angle relative the extension of the open slot 114 (e.g., an angle greater than 45 degrees).

As shown, the stop arm 116 defines a first side 117 for engaging the stop 96*a* on the first plate 70 and a second side 119 for engaging the spring 64.

Figure 15:
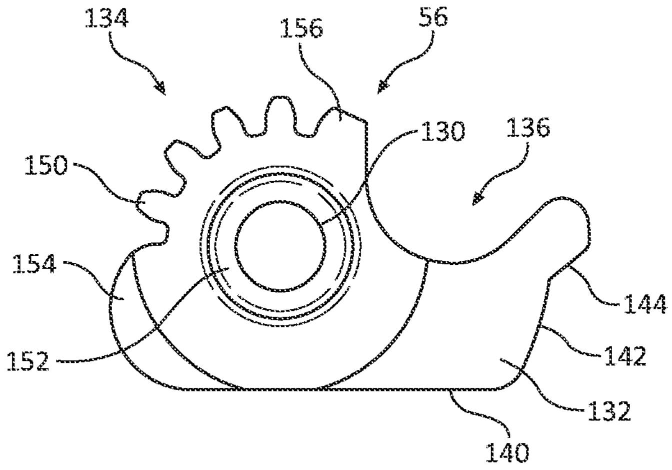
FIG. 15 is a side view of a cam gear of the lock assembly and FIG. 16 is a view oriented generally from the front of the cam gear, according to some examples.

As shown, the lock arm 118 defines a first side 122 for engaging the cam gear 56 (FIG. 15). The first side 122 is radiused according to some examples to form a recess providing clearance for the cam gear 56 as it rotates. The lock arm 118 also includes a terminal edge 124 at the end of the lock arm 118 for engaging the cam gear 56 and a chamfer edge 126 between the first side 122 and the terminal edge 124 that is angled relative to the first side 122 and the terminal edge 124 for engaging the cam gear 56. The lock arm 118 also includes a second side 128 generally opposite the first side 122 for engaging the stop 96*b* on the first plate 70.

As shown, the second catch 52 (FIG. 6) includes similar features, although the second catch 52 largely interacts with the second pair of stops 98 and lock cam 60 (as opposed to the first pair of stops 96 and cam gear 56). This relationship between the second catch 52, pair of stops 98, and lock cam 60 is subsequently described in further detail with reference to operation of the lock assembly 32.

Figure 16:
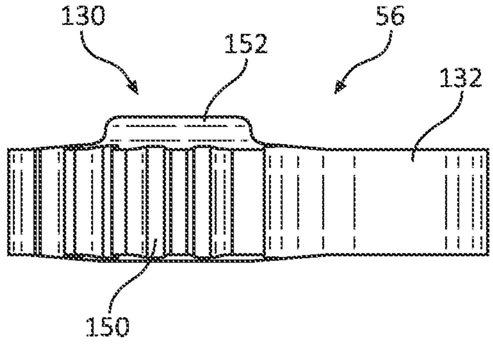

FIG. 15 is a side view of the cam gear 56 and FIG. 16 is a view oriented generally from the front of the cam gear 56, according to some examples. The cam gear 56 has a pivot aperture 130, includes a cam portion 132 and a gear portion 134, and defines a receiving pocket 136 between the cam and gear portions 132, 134.

As shown, the cam portion 132 projects generally radially from the gear portion 134 and has a first side 140 opposite the receiving pocket 136 for contacting the terminal edge 124 of the lock arm 118 (FIG. 12), a terminal cam edge 142 that is optionally radiused for contacting the terminal edge 124 as well as the chamfer edge 126 of the lock arm 118, and includes a toe projection having an edge 144 for contacting the first side 122 of the lock arm 118.

As shown, the gear portion 134 includes a plurality of teeth 150 for mating with the reversal gear 58 (FIG. 17), a collar 152, and a first stop 154 and a second stop 156 for engaging the reversal gear 58 to limit rotational travel of the cam gear 56 and the reversal gear 58.

As shown, the receiving pocket 136 is an arcuate recess configured to provide clearance to receive portions of the reversal gear 58 and/or the link 60 during operation of the lock assembly 32.

Figure 17:
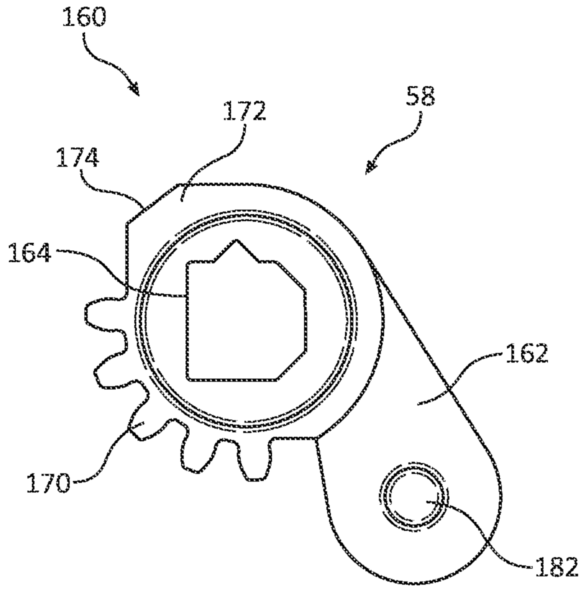
FIG. 17 is a side view of a reversal gear of the lock assembly and FIG. 18 is a view oriented generally from a front end view of the reversal gear, according to some examples.
Figure 18:
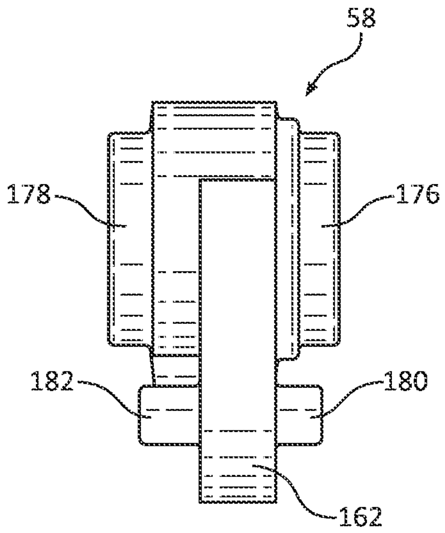

FIG. 17 is a side view of the reversal gear 58 and FIG. 18 is a view oriented generally from a front end view of the reversal gear 58, according to some examples. As shown, the reversal gear 58 includes a gear portion 160 and an arm portion 162 and has a drive aperture 164 in the gear portion 160.

As shown, the gear portion 160 of the reversal gear 58 includes a plurality of teeth 170 for mating with the teeth 150 of the cam gear 56 and projection 172 defining a flat 174 for engaging with the stop 154 of the cam gear 56 to limit rotational travel of cam gear 56 and reversal gear 58. The gear portion 160 also forms a first collar 176 and a second collar 178 projecting opposite the first portion, the first and second collars 176, 178 being substantially annular in shape. The collars 176, 178 are configured to be received in apertures in the first and second plates 70, 72, respectively, for pivotally supporting the reversal gear 58.

As shown, the arm portion 162 of the reversal gear 58 extends generally radially from the gear portion 160 and defines a slide post 180 and a pivot post 182. The slide post 180 is configured to be slidably received in the slot 90. Pivot post 182 is configured to be pivotally attached to the link 62.

As shown, the drive aperture 164 of the reversal gear 58 defines an asymmetric shape configured to mate with an operator, such as the interior lock operator 66 (FIG. 25), such that actuation of the operator results in rotation of the reversal gear 58 and, in turn, operation of the lock assembly 32.

Figure 19:
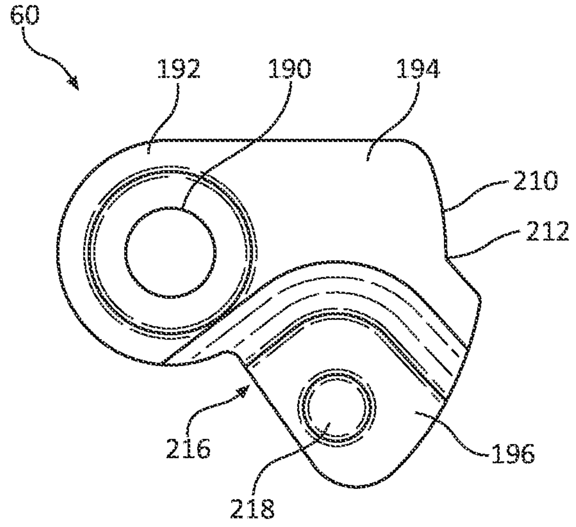
FIG. 19 is a side view of a lock cam of the lock assembly and FIG. 20 is a view oriented generally from a front end view of the lock cam, according to some examples.
Figure 20:
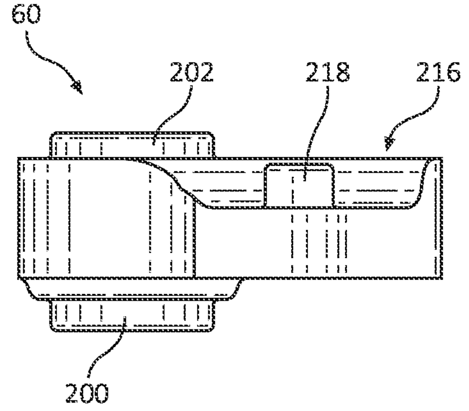

FIG. 19 is a side view of the lock cam 60 and FIG. 20 is a view oriented generally from a front end view of the lock cam 60, according to some examples. As shown, the lock cam 60 has a pivot aperture 190 in a pivot portion 192, a cam portion 194, and a link portion 196.

As shown, the pivot portion 192 defines exposed, projecting collars 200, 202 extending opposite one another. The collar 200 is configured to be received in the lock cam aperture 88 in the first plate 70 (FIG. 9) while the collar 202 is configured to be received in a similar aperture in the second plate 72 (FIG. 10).

As shown, the cam portion 194 projects generally radially from the pivot portion 192 and defines a rounded edge 210 and a corner 212 for engaging with a lock arm of the second catch 54 during operation of the lock assembly 32.

As shown, the link portion 196 projects generally radially from the pivot portion 192 and is located adjacent the cam portion 194. The link portion 196 defines a recessed surface pocket 216 for receiving the link 62 and includes a pivot post 218 projecting from the surface pocket 216 for pivotally coupling with the link 62.

Figure 21:
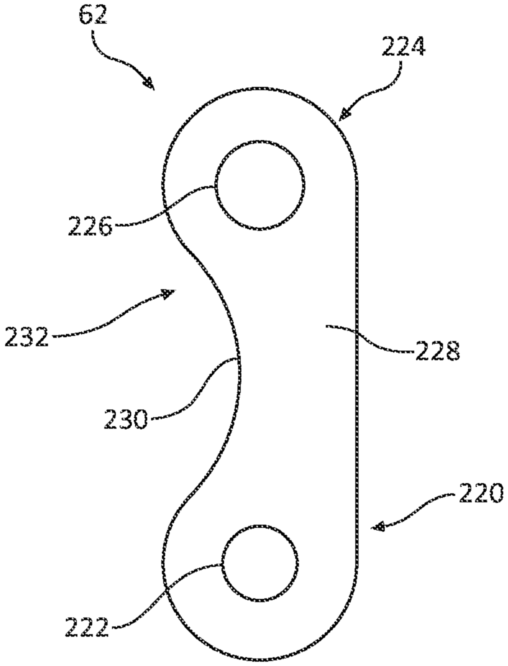
FIG. 21 is a side view of a link of the lock assembly and FIG. 22 is a view oriented generally from in front of the link, according to some embodiments.
Figure 22:
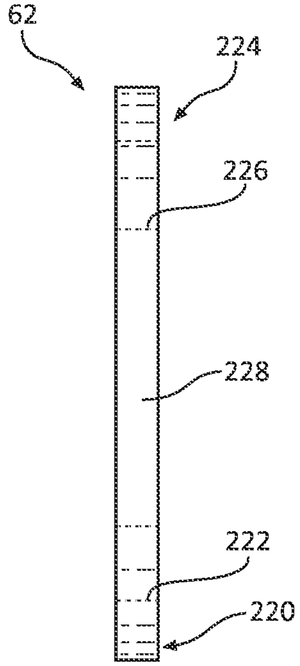

FIG. 21 is a side view of the link 62 and FIG. 22 is a view oriented generally from in front of the link 62, according to some embodiments. As shown, the link 62 includes a first pivot portion 220 with a first pivot aperture 222, a second pivot portion 224 with a second pivot aperture 226, and a body 228 between the first and second pivot portions 220, 224 defining a recessed edge 230 forming a pocket 232. The first pivot aperture 222 is configured to pivotally couple to the pivot post 182 of the reversal gear 58 while the second pivot aperture 222 is configured to pivotally couple to the pivot post 218 of the lock cam 60. The recessed edge 230 is configured to accommodate the gear portion 160 of the reversal gear 58 when the lock assembly 32 is in the unlocked position, also described as an unlocked state.

Figure 23:
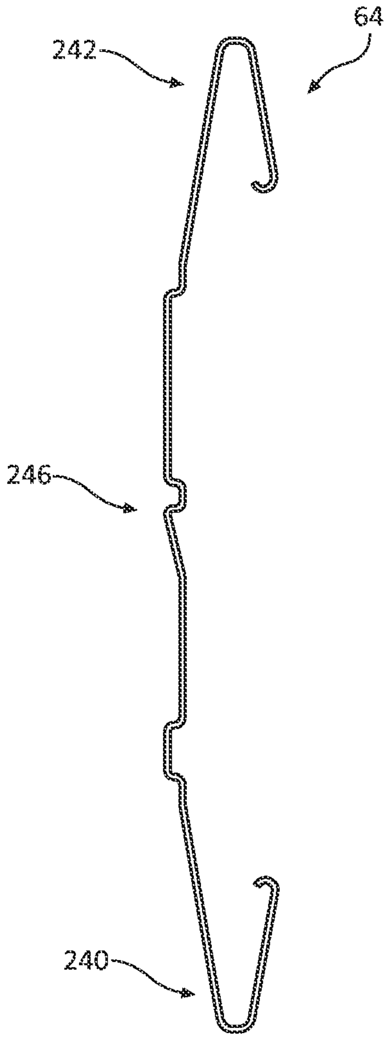
FIG. 23 is a side view of a spring of the lock assembly and FIG. 24 is a view oriented generally from on top of the spring, according to some embodiments.
Figure 24:
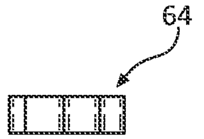

FIG. 23 is a side view of the spring 64 and FIG. 24 is a view oriented generally from on top of the spring 64, according to some embodiments. As shown, the spring 64 includes a first engagement portion 240, a second engagement portion 242, and a central portion 246 interconnecting the first and second engagement portions 240, 242. The first engagement portion 240 is configured engage the stop arm 116 of the first catch 52 to bias the first catch 52 to the open position. The second engagement portion 242 is configured to engage a stop arm of the second catch 54 to bias the second catch 54 to the open position. The central portion 246 is configured to mate with one or more features (e.g., bent tabs) of the first and second plates 70, 72 to maintain the spring 64 in an operational relationship with the other components.

Figure 25:
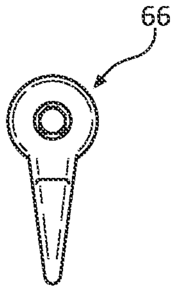
FIG. 25 is a first side view.
Figure 26:
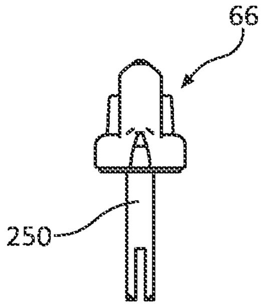
FIG. 26 is a front view.
Figure 27:
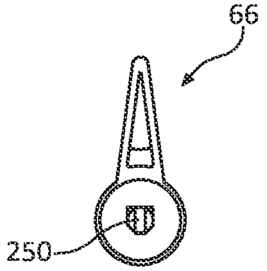
FIG. 27 is a second side view of an interior lock operator of the lock assembly, according to some embodiments.

FIG. 25 is a first side view, FIG. 26 is a front view, and FIG. 27 is a second side view of the interior lock operator 66, according to some embodiments. As shown, the interior lock operator 66 includes a stem 250 that is optionally keyed to drive aperture 164 of the reversal gear 58 such that rotation of the lock operator 66 (e.g., by a user positioned on an interior side of the fenestration assembly 10) results in the lock assembly 32 being actuated between locked and unlocked states. An exterior operator, such as a lockset (not shown) is optionally connected to the lock operator 66 for external operation of the lock assembly 32 as desired.

Figure 28:
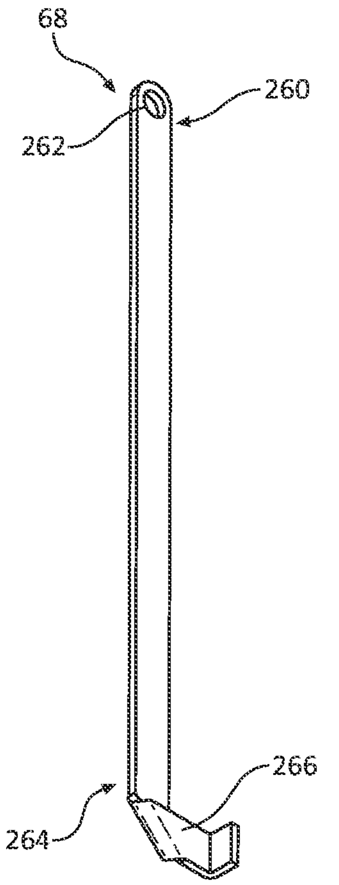
FIG. 28 is an isometric view and FIG. 29 is a side view of the accessory bar of the lock assembly, according to some examples.
Figure 29:
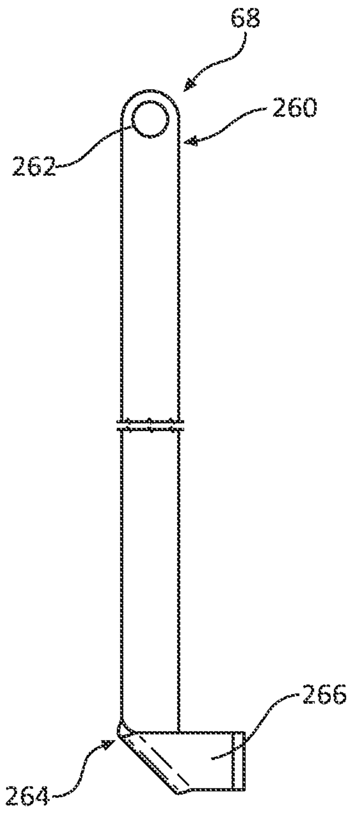

FIG. 28 is an isometric view and FIG. 29 is a side view of the accessory bar 68, according to some examples. As shown, the accessory bar 68 is substantially elongate and includes a first end 260 having an aperture 262 and a second end 264 forming a tab 266. The aperture 262 is configured to mate with the slide post 180 of the reversal gear 58 (FIG. 17). As shown, the tab 262 is formed as a widened feature at the second end 264 of the accessory bar 68. The tab 262 can be formed as part of a bending process, for example. In some examples, the tab 262 is used to engage the accessory bar 68 with a portion of a sensor system, such as a mechanical switch of a sensor system.

As shown in FIG. 3, the strike assembly 34 preferably includes a first strike 280 and a second strike 282 spaced from the first strike 280. The first and second strikes 280, 282 are optionally substantially similar. Therefore, in accordance with various examples, features of both the first and second strikes 280, 282 are described collectively with respect to the features of the first strike 280.

Figure 30:
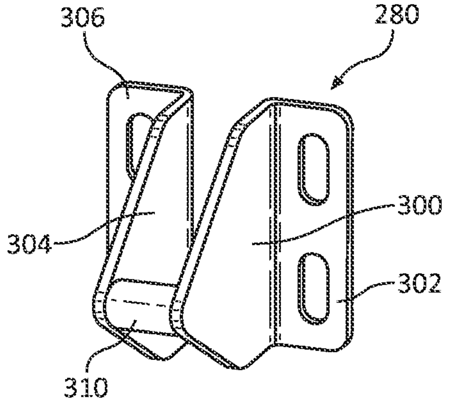
FIG. 30 is an isometric view of a first strike of the locking system, according to some examples.

FIG. 30 is an isometric view of the first strike 280, according to some examples. As shown, the first strike includes a first flange 300 with a base 302 configured to mount to a door jamb, for example, as well as a second flange 304 with a base 306 configured to mount to a door jamb, for example, and a strike post 310 extending between the first and second flanges 300, 304. The strike post 310 is generally configured to be capture by a catch, such as the first catch 52 and the second catch 54 of the lock assembly 32. The first and second strikes 280, 282 are optionally spaced apart any of a variety of distances depending on the complementary lock assembly 32, but are spaced part by about 3 inches (center-to-center) according to some embodiments. From the foregoing, it should be apparent that the strike post 310 of the first catch 52 is spaced apart by about 3 inches (center-to-center) from a strike post 312 (FIG. 31) of the second catch 54, according to some examples.

As shown in FIG. 6, assembly of the lock assembly 32 includes pivotally securing the first and second catches 52, 54, to the housing 50. For example, the first catch 52 is pivotally secured to housing using a pin 320 (e.g., similar to the pin 74 shown in FIG. 11) that is secured in the pivot aperture 108 (FIG. 12) of the first catch 52 and in the first catch pivot aperture 80 (FIG. 9) in the first plate 70. As shown in FIG. 4, the pin 320 is also secured in a first catch pivot aperture 80*a* (FIG. 10) in the second plate 72. The second catch 54 is similarly pivotally coupled between to the housing using a pin 322 secured in the second catch pivot aperture 82 in the first plate 70 (FIG. 9), a pivot aperture 108*a* in the second catch 54, and a second catch pivot aperture 82*a* (FIG. 10) in the second plate 72 using a pin 304 (e.g., similar to the pin 74 shown in FIG. 11).

The spring 64 is secured to the housing between the first and second plates 70, 72 with the first engagement portion 240 engaged with the stop arm 116 of the first catch 52 to yieldably bias the first catch 52 in a clockwise direction (when viewing FIG. 6). Clockwise rotation of the first catch 52 is limited by a stop 96*a* (FIG. 9) of the first plate 70 and/or a similar stop feature of the second plate 72. The second engagement portion 242 of the spring 64 is engaged with the stop arm 116*a* of the second catch 54 to yieldably bias the second catch 54 in a counter-clockwise direction (when viewing FIG. 6). Counter-clockwise rotation of the second catch 52 is limited by a stop 98*a* (FIG. 9) of the first plate 70 and/or a similar stop feature of the second plate 72.

In some examples, the spring 64 engages the stop arms 116, 116*a* to providing an over-center bias on the first and second catches 52, 54. The spring 64 yieldably biases the first and second catches 52, 54 in a first direction when the stop arms 116, 116*a* are located on a first side of a center position (e.g., corresponding generally to an intermediate rotational position of the catches 52, 54 between the locked and unlocked positions) and in a second, opposite direction when the stop arms 116, 116*a* are located on a second side of a center position. In other words, as the catches are moved toward the locked position, the spring 64 "flips" in bias (from biasing the catches 52, 54 to the unlocked position) and yieldably biases the catches 52, 54 toward the locked position and vice versa. As previously mentioned, the stops 96, 98 help prevent rotation of the catches 52, 54 beyond the locked and unlocked positions, respectively.

The cam gear 56 is pivotally secured to the housing 50 between the first and second plates 70, 72 with a pin 324 (e.g., similar to the pin 74 shown in FIG. 11) secured through the pivot aperture 130 in the cam gear 56, the cam gear aperture 84 (FIG. 9) in the first plate 70 and a cam gear aperture 84*a* (FIG. 10) in the second plate 72. As shown, the cam gear 56 is located between the first and second catches 52, 54, and more specifically adjacent the first catch 52, in a generally central location of the housing 50.

The reversal gear 58 is pivotally secured to the housing 50 between the first and second plates 70, 72 with the first collar 176 (FIG. 18) received in the reversal gear aperture 86 in the first plate 70 (FIG. 9) and the second collar 178 (FIG. 18) received in a reversal gear aperture 86*a* (FIG. 10) in the second plate 72. As shown, the teeth 170 (FIG. 17) of the reversal gear 58 are mated with the teeth 150 (FIG. 15) of the cam gear 56. The cam gear 56 and the reversal gear 58 have intermeshing teeth for transferring rotational movement of the cam gear 56 to the reversal gear 58, and vice versa. The reversal gear 58 is also located between the first and second catches 52, 54, and more specifically between the cam gear 56 and the lock cam 60 in a generally central location of the housing 50. The slide post 180 (FIG. 18) is slidably received in the arcuate slot 90 (FIG. 9) of the first plate 70 and the pivot post 182 (FIG. 18) is slidably received in an arcuate slot 90*a* (FIG. 10) of the second plate 72.

The lock cam 60 is pivotally secured to the housing 50 between the first and second plates 70, 72 with the first collar 200 (FIG. 20) received in the lock cam aperture 88 in the first plate 70 (FIG. 9) and the second collar 202 (FIG. 20) received in a lock cam aperture 88*a* (FIG. 10) in the second plate 72. The lock cam 60 is located between the first and second catches 52, 54, and more specifically adjacent to the second catch 54 and in a generally central location of the housing 50.

The link 62 is received between the cam gear 56 and the lock cam 60 and operatively links the reversal gear 58 and the lock cam 60. As shown in FIG. 6, the first pivot aperture 222 (FIG. 21) of the link 62 is pivotally secured to the pivot post 182 of the reversal gear 58 and to the second pivot aperture 226 (FIG. 21) of the link 62 is pivotally secured to the pivot post 218 of the lock cam 60. In the unlocked state shown in FIG. 6, the first pivot portion 220 of the link 62 is received in the receiving pocket 136 (FIG. 15) of the cam gear 56 and the gear portion 160 (FIG. 17) of the reversal gear 58 is received in the pocket 232 (FIG. 21) formed by the recessed edge 230 of the link 62. This nested arrangement, along with the centrally located components, helps the lock assembly 32 provide a relatively compact design, according to various examples.

In some examples, the accessory bar 68 is slidably received through the arm guide 92 (FIG. 9) with the slide post 180 (FIG. 18) of the reversal gear 58 received through the aperture 262 (FIG. 29) of the accessory bar 68. In this manner, rotation of the reversal gear 58 (e.g., by manual or other operation) results in generally linear (e.g., vertical) sliding of the accessory bar 68. In some embodiments, this translational movement is utilized in association with a sensing operation to detect when the lock assembly 32 has been transitioned between locked and unlocked states.

As shown in FIG. 3 the lock assembly 32 is received in the pocket 20*a* in the door stile 20 and the strike assembly 34 is received in the pocket 22*a* of the lock jamb 22. The lock assembly is secured in the pocket 22*a* using any of a variety of suitable fastening means (e.g., screws secured through the flanges 100, 100*a* of the housing 50). And similarly, the strike assembly 34 is secured in the pocket 22*a* of the lock jamb 22 using any of a variety of suitable fastening means (e.g., screws secured through the first and second strikes 280, 282). The first and second strikes 280, 282 and first and second catches 52, 54 are operationally aligned such that the first and second strikes 280, 282 and catches 52, 54 can be cooperatively engaged when closing the panel 12.

Figure 33:
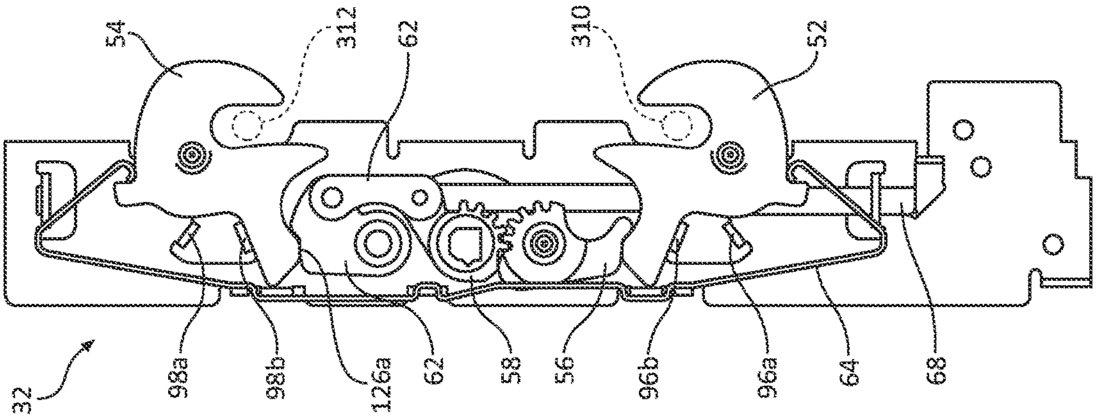
FIG. 33 is a representation of the locking system in a closed, locked state, according to some examples.
Figure 32:
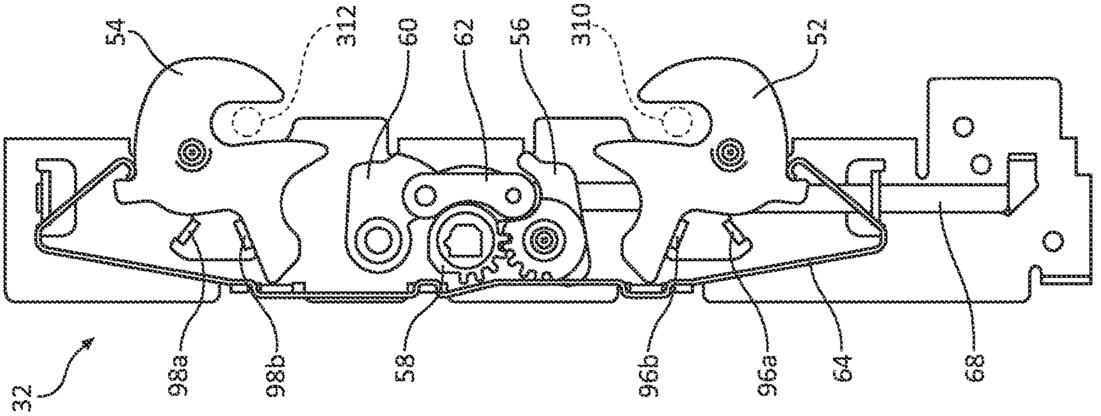
FIG. 32 is a representation of the locking system in a closed, unlocked state, according to some examples.
Figure 31:
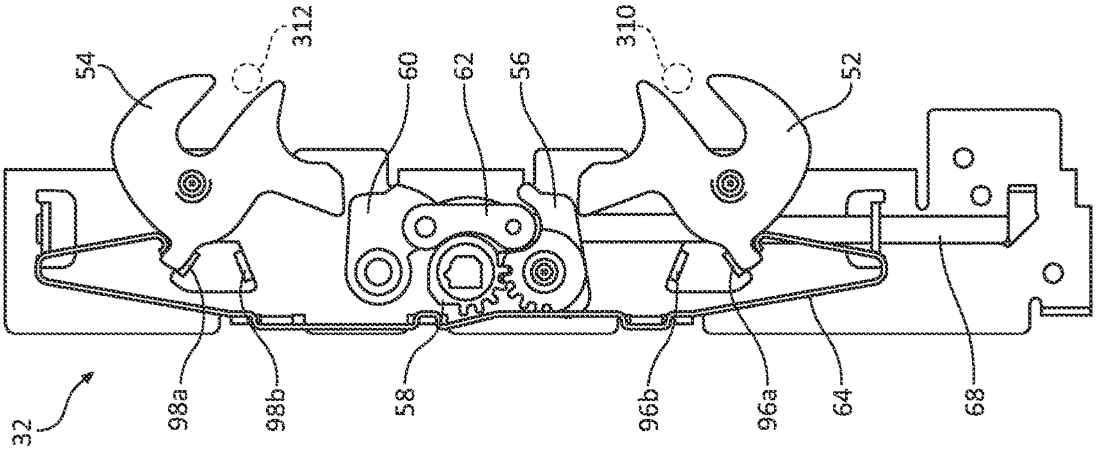
FIG. 31 is a representation of the locking system in an open, unlocked state, according to some examples.

Examples of operation of the locking system 30 are provided below with reference to the figures, including FIGS. 31-33, where FIG. 31 is a representation of the locking system 30 in an open, unlocked state; FIG. 32 is a representation of the locking system 30 in a closed, unlocked state; and FIG. 33 is a representation of the locking system 30 in a closed, locked state. In FIGS. 31-33, the lock assembly 32 is shown without the second plate 72 and only the strike posts 310, 312 of the first and second strikes 280, 282 are shown in broken lines to facilitate operational illustration. Other features of the fenestration unit 10 are similarly not shown to facilitate operational illustration.

In use, as the first panel 12 is closed, the first and second strike posts 310, 312 shift the first and second catches 52, 54 against the bias of spring 64 toward an engaged position corresponding to the closed position of the fenestration unit 10. The longer jaws of each of the first and second catches 52, 54 cam against strike posts 310, 312, respectively, during sliding of the first panel 12 toward the closed position. In particular, during closing movement of the first panel 12 (e.g., in the rightward direction of FIG. 1), the first and second catches 52, 54 receive and slide against the strike posts 310, 312 which results in counter-clockwise rotation of the first catch 52 and clockwise rotation of the second catch 54 from the position in FIG. 31 to the position generally indicated in FIG. 32. Such rotation of the catches 52, 54 causes the shorter jaws to wrap around the strike posts 310, 312 so that the posts 310, 312 are progressively captured between the jaws of the catches 52, 54.

Once the first panel 12 has been moved to the closed position, the strike posts 310, 312 will have shifted the catches 52, 54 to the engaged positions shown in FIGS. 32 and 33. Although the strike posts 310, 312 are retained within the first and catches 52, 54 is in its engaged position, the first panel 12 is freely shiftable out of the closed position (e.g., by pulling on the handle 24 (FIG. 2). That is, the first and second catches 52, 54 alone do not serve to lock the first panel 12 in the closed position.

As previously referenced, the cam gear 56 (FIG. 15) includes a first stop 154 and a second stop 156 situated on either end of the teeth 150 for limiting relative rotational movement of the cam gear 56. As the cam gear 56 and the reversal gear 58 are rotated in one direction and the other the first and second stops 154, 156 limit over rotation of the reversal gear 58 in one direction or the other. In other words, the cam gear 56 and reversal gear 58 limit rotational movement of the lock assembly 32 between the locked and unlocked positions.

In some examples, the first and second catches 52, 54 are transitionable between a first, open position and a second, closed position. The reversal gear 58 is rotatable between a first, locked position in which the first and second catches 52, 54 are configured to be prevented from transitioning from the second, closed position, to the first, open position and a second, unlocked position in which the first and second catches 52, 54 are able to transition from the second, closed position to the first, open position. The reversal gear 58 is also configured to be prevented from being transitioned to the locked position when the first and second catches 52, 54 are in the open position. The lock assembly 32 is configured to prevent "lock-out" situations traditionally caused by the user inadvertently actuating the lock mechanism while the panel 12 is open. In other words, the lock assembly 32 includes a safety configured to prevent locking when the panel 12 is open. Moreover, the lock assembly 32 is designed to facilitate locking the locking the first and second catches 52, 54 in the closed position even when the panel 12 has been left slightly ajar, and is capable of sliding an ajar panel 12 shut when the lock assembly 32 is actuated to the locked position.

When the first panel 12 is in the open position, and thus the first and second catches 52, 54 are in the open position, the operation of the lock assembly 32 from the unlocked position to the locked position is inhibited. For example, as shown in FIG. 6, the cam gear 56 engages the lock arm 118 of the first catch 52 in a generally radial direction relative to the center of rotation of the first catch 52 when the first catch is in the fully open position. In other words, the first side 140 (FIG. 15) of the cam gear 56 engages the lock arm 118 to generate a force toward the center of rotation, which does not result in rotation of the first catch 52, according to some examples. Although not necessary, in some examples the lock cam 60 similarly engages the second catch 54 in a radial direction, exerting a force toward the center of rotation of the second catch 54 which does not result in rotation of the second catch 54. In other words, according to some examples, the lock assembly 32 is configured to prevent transitioning to the locked configuration when the first panel 12 is in the open position.

As the door panel 12 is slid closed, and the strike posts 310, 312 are engaged with the catches 52, 54, the catches 52, 54 begin to rotate. At some point after the catches 52, 54 begin to rotate, the cam gear 56 and the lock cam 60 are free to engage the catches 52, 54 to cause further rotation of the catches 52, 54. In particular, the geometry of the components is selected such that after rotation out of the fully open position, the cam gear 56 and the lock cam 60 no longer generate substantially radial forces through the center of rotation of the first and second catches 52, 54, but also includes a tangential force component to encourage rotation. For example, rotation of the reversal gear 58 in a counter-clockwise direction as shown in FIG. 6 can assist with rotating the catches 52, 54 and assisting with "pulling" the panel 12 closed into a fully closed, and locked, position. As the terminal cam edge 142 (FIG. 15) of the cam gear 56 engages the chamfer edge 126 (FIG. 12) of the first catch 52 the first catch 52 is rotated. Similarly, as the rounded edge 210 (FIG. 19) of the lock cam 60 engages a chamfer edge of the second catch 54, the second catch 54 is rotated.

In this respect, even with the panel 12 spaced slightly from its closed position, the lock assembly 32 may be actuated to lock the lock assembly 32. For example, if the user has left the panel 12 slightly ajar with the catches 52, 54 in an intermediate position and the strike posts 310, 312 received within the catches 52, 54, the lock assembly 32 may be transitioned to its locked state to rotate the catches 52, 54 to draw the panel 12 to the closed position. In some examples, this helps minimizes the effort and degree of attention required to lock the panel 12 in the closed position—the user simply needs to place the panel 12 near its closed position actuate the lock assembly 32.

FIG. 33 shows the lock assembly 32 is transitioned to the fully closed, and locked position. As shown, the terminal cam edge 142 and the edge 144 (FIG. 15) of the cam gear 56 engage the chamfer edge 126 and the first side 122 (FIG. 12) of the first catch 52, respectively. Rotation of the first catch 52 is substantially inhibited at this point. For example, any opening force exerted on the first catch 52 tends to result in a radial force generally toward the center of rotation of the cam gear 56. In turn, the rounded edge 210 and the corner 212 (FIG. 19) of the lock cam 60 engage the chamfer edge 126*a* of the second catch 52. Similarly, any opening force exerted on the second catch 54 tends to result in a radial force generally toward the center of rotation of the lock cam 60. That is, forces urging the catches 52, 54 in a direction out of the engaged position are unable to unlock the mechanism 52.

As can be seen from a comparison of FIGS. 32 and 33, the accessory bar 68 is slid vertically as the lock assembly 32 is transitioned to from the unlocked state to the locked state. In the illustrated examples, the accessory bar 68 is retracted vertically in the locked state, although other configurations (extended, in the locked state, for example) are also contemplated.

As shown in FIG. 33, when the panel 12 is closed, the strike posts 310, 312 are received between the two catches 52, 54 to vertically capture the panel 12. By vertically capturing the catches 52, 54, the first and second strikes 280, 282 helps minimize the risk of intrusion through the sliding door traditionally achieved by dislodging the panel 12 from a roller track, for example. It will be appreciated that such dislodgement of the panel 12 requires vertical shifting of the panel 12 relative to the frame 18 so that the strike post(s) 310, 312 are released from the catches 52, 54.

Figure 34:
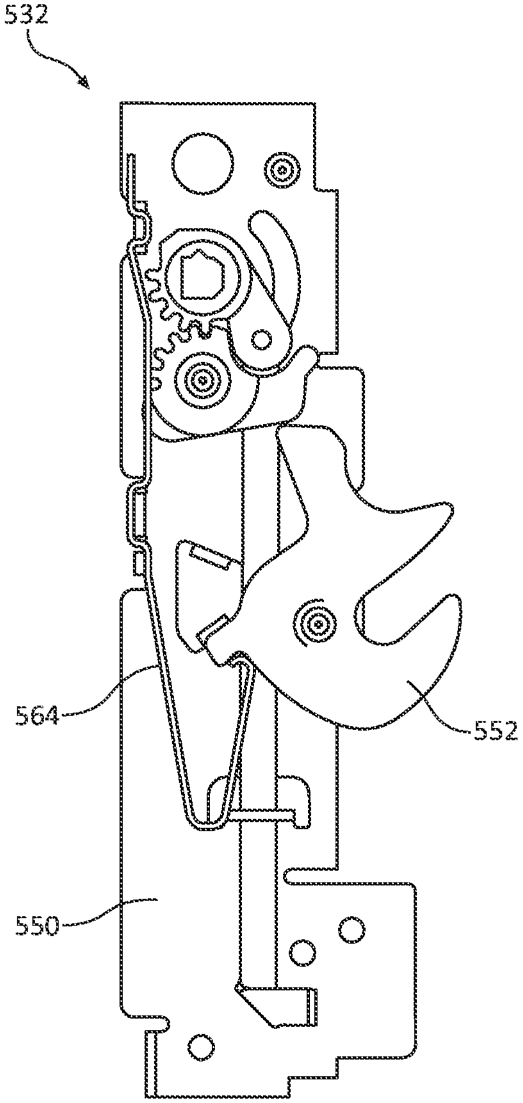
FIG. 34 a modified lock assembly including a single catch, according to some examples.

Although the preceding examples are made with reference to lock assemblies having multiple catches, a modified lock assembly 532 is shown in FIG. 34 including a single catch 552. As shown, the lock assembly 532 includes substantially similar components to that of the lock assembly 32, with the exception of the lock cam 60, second catch 54, and with a modified (shortened) spring 564 and housing 550. Operation of the lock assembly 532 is substantially similar to the lock assembly 32, with the exceptions noted above.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A fenestration system comprising:
a door frame including a lock jamb;
a strike assembly secured to the lock jamb;
a sliding panel received in the door frame, the sliding panel including a lock stile;
a lock assembly secured to the lock stile, the lock assembly being transitionable between a locked state with the strike assembly and an unlocked state with the strike assembly, the lock assembly including:
a housing;
a cam gear pivotally secured to the housing and defining a receiving pocket and a cam surface;
a reversal gear pivotally secured to the housing and engaging the cam gear, the reversal gear being rotatable between a first, locked position and a second, unlocked position;
a lock cam pivotally secured to the housing and including a cam portion and a link portion and defining a cam surface;
a first catch pivotally secured to the housing and configured to interact with the cam gear;
a second catch pivotally secured to the housing and configured to interact with the lock cam; and
a link pivotally secured to the reversal gear and the lock cam, such that the reversal gear is prevented from being transitioned to the first, locked position when the first and second catches are in a first, open position by the cam surface of the cam gear engaging the first catch and the cam surface of the lock cam engaging the second catch,
wherein the lock assembly is prevented from transitioning from the unlocked state to the locked state until the first and second catches are transitioned from the first, open position to a second, closed position, and
wherein when the first and second catches are transitioned to the second, closed position, the reversal gear transitions to the first, locked position and the lock assembly is then capable of being transitioned to the locked state.

2. The fenestration system of claim 1, wherein the reversal gear is rotatable between a first, locked position in which the first and second catches are configured to limit from transitioning from the second, closed position, to the first, open position and a second, unlocked position in which the first and second catches are able to transition from the second, closed position to the first, open position.

3. The fenestration system of claim 1, wherein the strike assembly includes a first strike having a strike post and a second strike having a strike post.

4. The fenestration system of claim 1, further comprising a lock spring engaging the first and second catches to bias the first and second catches toward the first, open position.

5. A fenestration system comprising:
a door frame including a lock jamb;
a strike assembly secured to the lock jamb;
a sliding panel received in the door frame, the sliding panel including a lock stile;
a lock assembly secured to the lock stile, the lock assembly being transitionable between
a locked state with the strike assembly and an unlocked state with the strike assembly, the lock assembly including:
a housing;
a cam gear pivotally secured to the housing and defining a receiving pocket and a gear portion having a plurality of teeth;
a reversal gear pivotally secured to the housing and including an arm portion slidably coupled to the housing and a gear portion including a plurality of teeth positioned to engage with the gear portion of the cam gear, the reversal gear being rotatable between a first, locked position and a second unlocked position; and a catch pivotally secured to the housing to be transitioned between a first open, position to a second, closed position, wherein when the catch is in the first, open position, the reversal gear is prevented from transitioning to the first, locked position, and the lock assembly is prevented from transitioning from the unlocked state to the locked state until the catch is transitioned from the first open position, to the second, closed position.

6. The fenestration system of claim 5, further comprising a lock spring engaging the first catch to bias the catch toward the first, open position.

7. The fenestration system of claim 5, further comprising a second catch pivotally secured to the housing, the lock assembly being incapable of transitioning from the unlocked state to the locked state when the second catch is in an open position.

8. A lock assembly configured to be secured to a lock stile and engage a strike assembly, the lock assembly being transitionable between a locked stated with the strike assembly and an unlocked state with the strike assembly, the lock assembly including:

a housing;

a cam gear pivotally secured to the housing and defining a receiving pocket and a gear portion having a plurality of teeth;

a reversal gear pivotally secured to the housing and including an arm portion slidably coupled to the housing and a gear portion including a plurality of teeth positioned to engage with the gear portion of the cam gear, the reversal gear being rotatable between a first locked position and a second, unlocked position; and a catch pivotally secured to the housing to be transitioned between a first open, position to a second, closed position, wherein when the catch is in the first, open position, the reversal gear is prevented from transitioning to the first, locked position, and the lock assembly is prevented from transitioning from the unlocked state to the locked state until the catch is transitioned from the first open position, to the second, closed position.

9. The lock assembly of claim 8, further comprising a lock spring engaging the first catch to bias the catch toward the first, open position.

10. The lock assembly of claim 8, further comprising a second catch pivotally secured to the housing, the lock assembly being incapable of transitioning from the unlocked state to the locked state when the second catch is in an open position.

11. A lock assembly configured to be secured to a lock stile and engage a strike assembly, the lock assembly being transitionable between a locked stated with the strike assembly and an unlocked state with the strike assembly, the lock assembly including:

a housing;

a cam gear pivotally secured to the housing and defining a receiving pocket and a gear portion having a plurality of teeth, the cam gear defining a cam surface;

a reversal gear pivotally secured to the housing and including a gear portion including a plurality of teeth positioned to engage with the gear portion of the cam gear, the reversal gear being rotatable between a first, locked position and a second, unlocked position;

a lock cam pivotally secured to the housing and including a cam portion and a link portion and defining a cam surface;

a first catch pivotally secured to the housing and configured to interact with the cam gear;

a second catch pivotally secured to the housing and configured to interact with the lock cam;

a link pivotally secured to the reversal gear and the lock cam, such that the reversal gear is prevented from being transitioned to the first, locked position when the first and second catches are in a first, open position by the cam surface of the cam gear engaging the first catch and the cam surface of the lock cam engaging the second catch, wherein the lock assembly is prevented from transitioning from the unlocked state to the locked state until the first and second catches are transitioned from the first, open position to a second, closed position, wherein the reversal gear is able to transition to the first, locked position when the first and second catches are in the second, closed position and the lock assembly is then capable of being transitioned to the locked state; and a lock spring engaging the first and second catches to bias the first and second catches toward the first, open position.

12. The lock assembly of claim 11, wherein the reversal gear is rotatable between a first, locked position in which the first and second catches are configured to limit from transitioning from the second, closed position, to the first, open position and a second, unlocked position in which the first and second catches are able to transition from the second, closed position to the first, open position.

13. The lock assembly of claim 11, wherein the strike assembly includes a first strike having a strike post and a second strike having a strike post.

14. The lock assembly of claim 11, further comprising a lock spring engaging the first and second catches to bias the first and second catches toward the first, open position.

15. The fenestration system of claim 3, wherein the unlocked state of the lock assembly includes an open, unlocked state and a closed, unlocked state, and wherein the first catch retains the strike post of the first strike and the second catch retains the strike post of the second strike when the lock assembly is in both the locked state and the closed, unlocked state.

16. The fenestration system of claim 15, wherein when the first catch engages with the strike post of the first strike, the first catch begins to pivot about a pin from the first, open position toward the second, closed position.

17. The fenestration system of claim 5, wherein the unlocked state of the lock assembly includes an open, unlocked state and a closed, unlocked state, and wherein the catch retains a strike post of the strike assembly when the lock assembly is in both the locked state and the closed, unlocked state.

18. The lock assembly of claim 8, wherein the unlocked state of the lock assembly includes an open, unlocked state and a closed, unlocked state, and wherein the catch retains a strike post of the strike assembly when the lock assembly is in both the locked state and the closed, unlocked state.

19. The lock assembly of claim 13, wherein the unlocked state of the lock assembly includes an open, unlocked state and a closed, unlocked state, and wherein the first catch retains the strike post of the first strike and the second catch retains the strike post of the second strike when the lock assembly is in both the locked state and the closed, unlocked state.

20. The lock assembly of claim 19, wherein when the first catch engages with the strike post of the first strike, the first catch begins to pivot about a pin from the first, open position toward the second, closed position.

* * * * *